No. 666,283. Patented Jan. 22, 1901.
C. A. PARSONS, G. G. STONEY & H. F. FULLAGAR.
MACHINE FOR MANUFACTURING RINGS OR SECTIONS OF TURBINE BLADES.
(Application filed Oct. 30, 1900.)
(No Model.) 4 Sheets—Sheet 1.
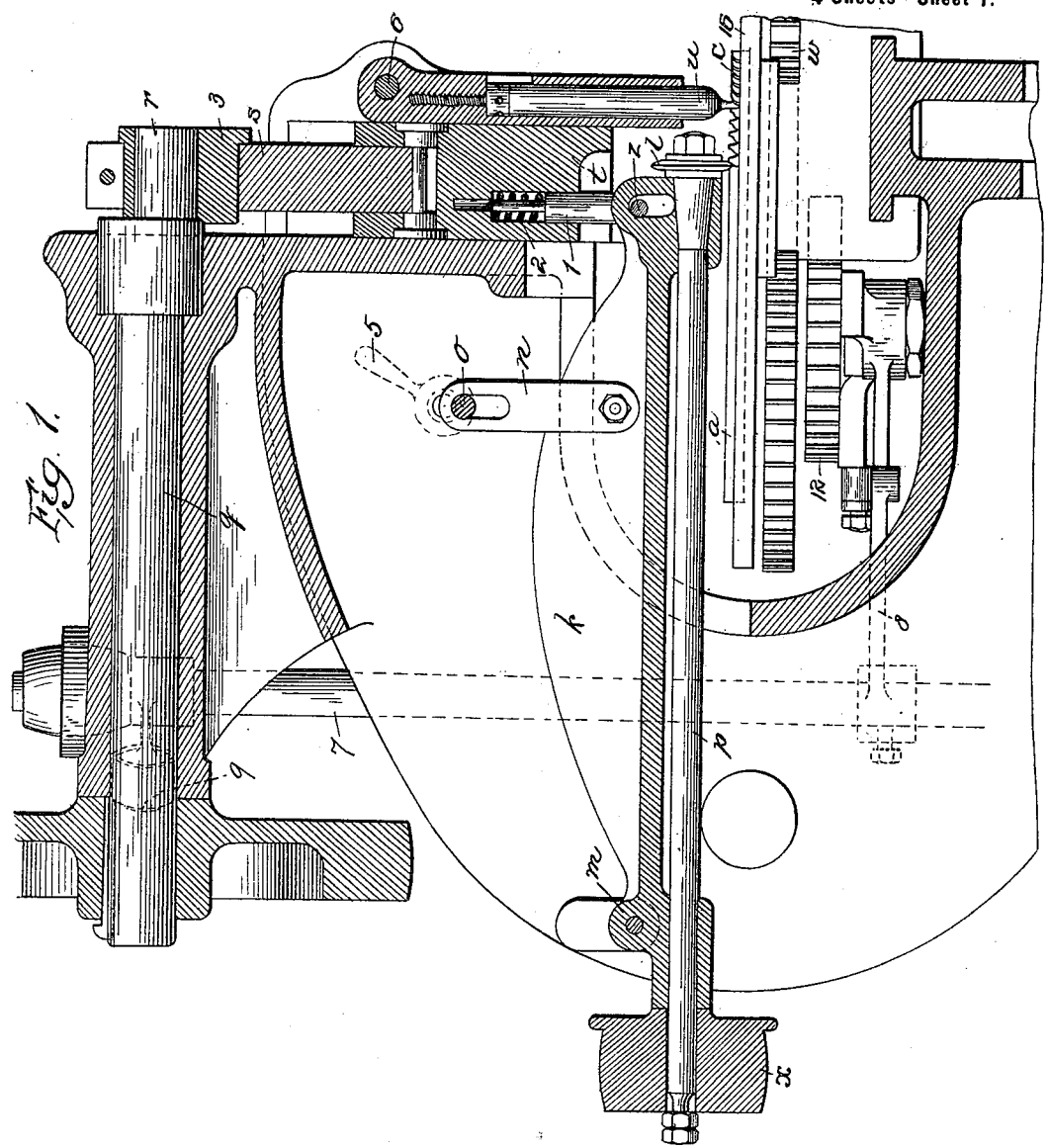
Witnesses
Edw. L. Reed.
James M. Shea.
Inventors
Charles A. Parsons,
George G. Stoney,
Hugh F. Fullagar.
by Richards & Co. Attys.
THE NORRIS PETERS CO., PHOTO-LITHO., WASHINGTON, D. C.

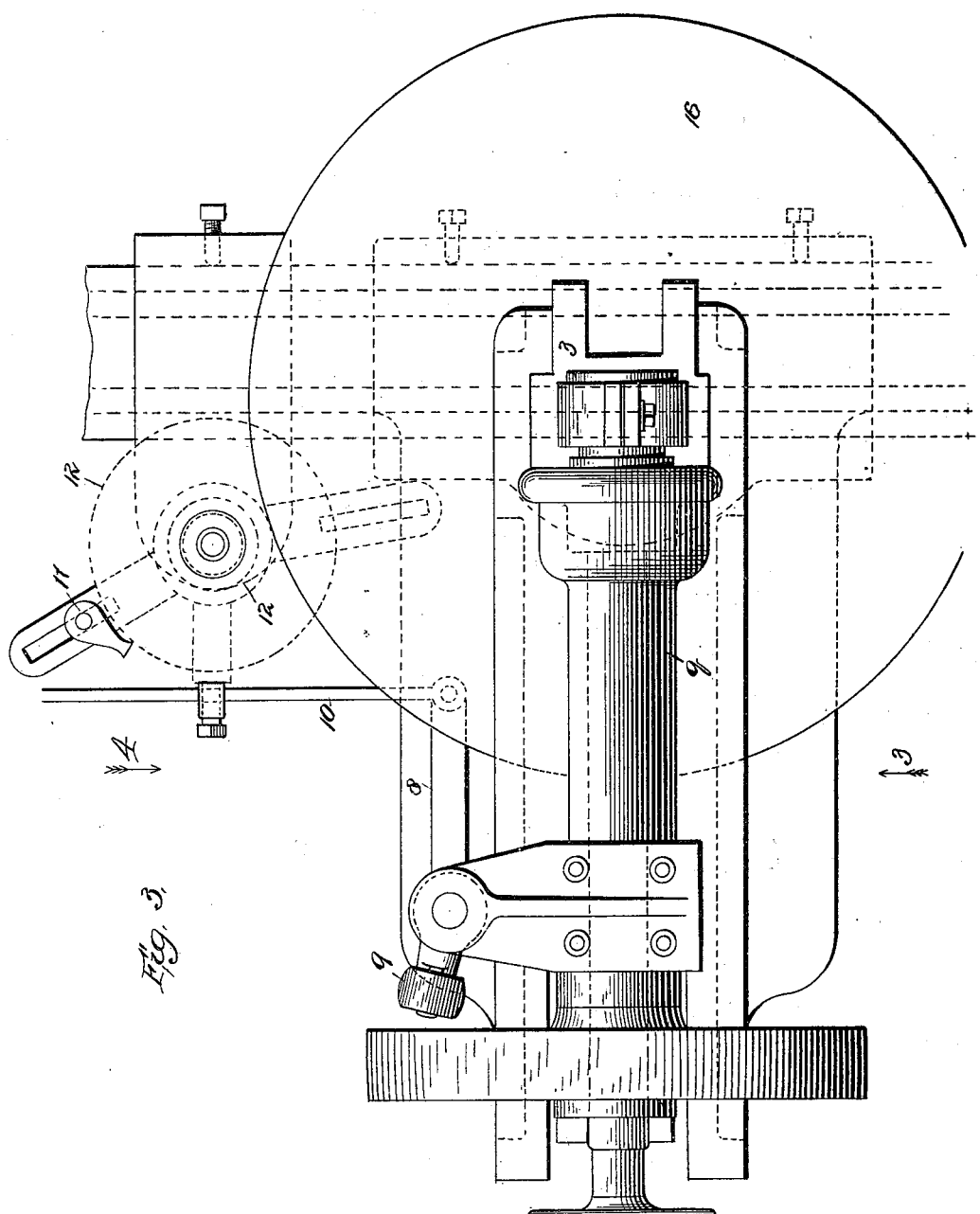

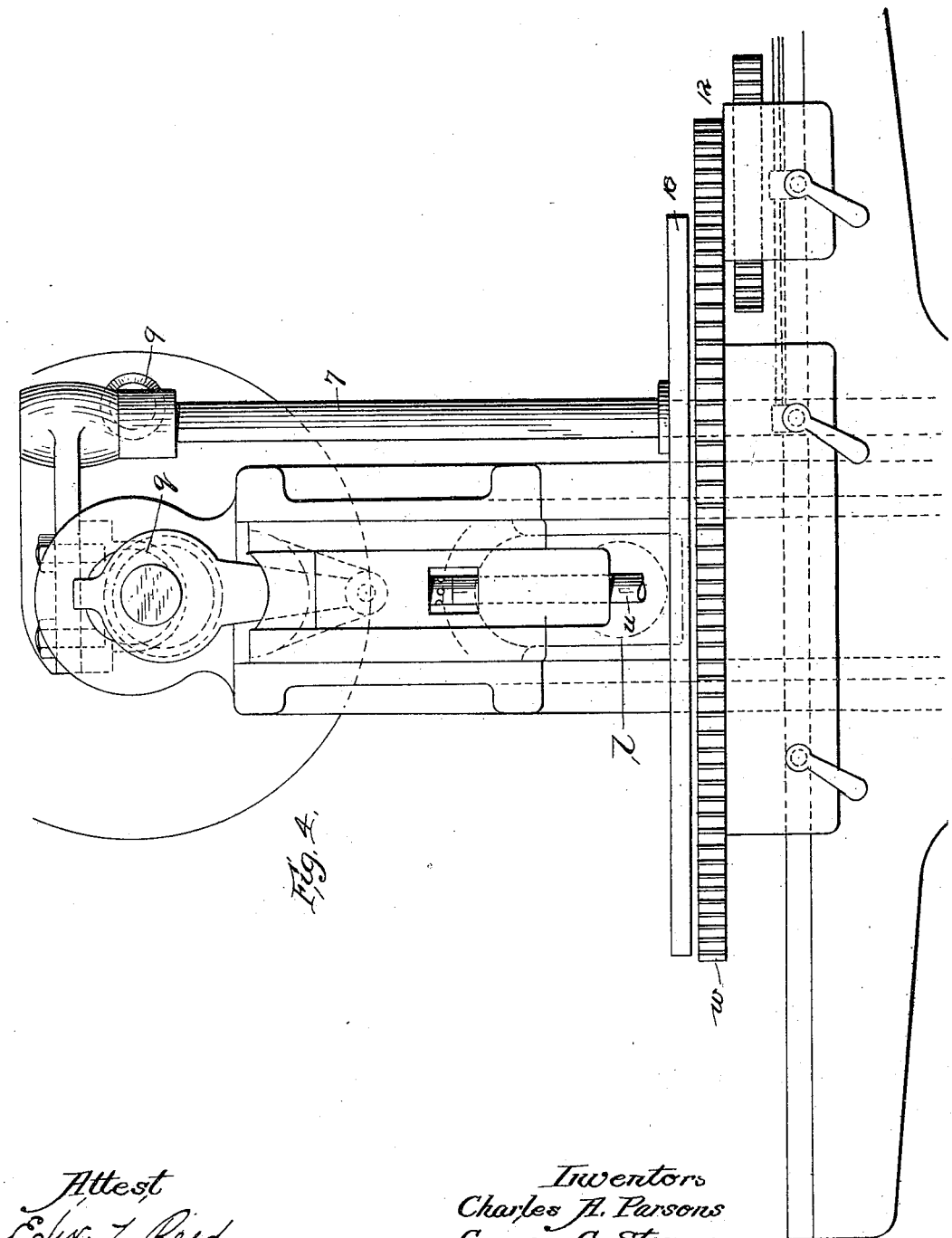

No. 666,283. Patented Jan. 22, 1901.
C. A. PARSONS, G. G. STONEY & H. F. FULLAGAR.
MACHINE FOR MANUFACTURING RINGS OR SECTIONS OF TURBINE BLADES.
(Application filed Oct. 30, 1900.)
(No Model.)
4 Sheets—Sheet 4.
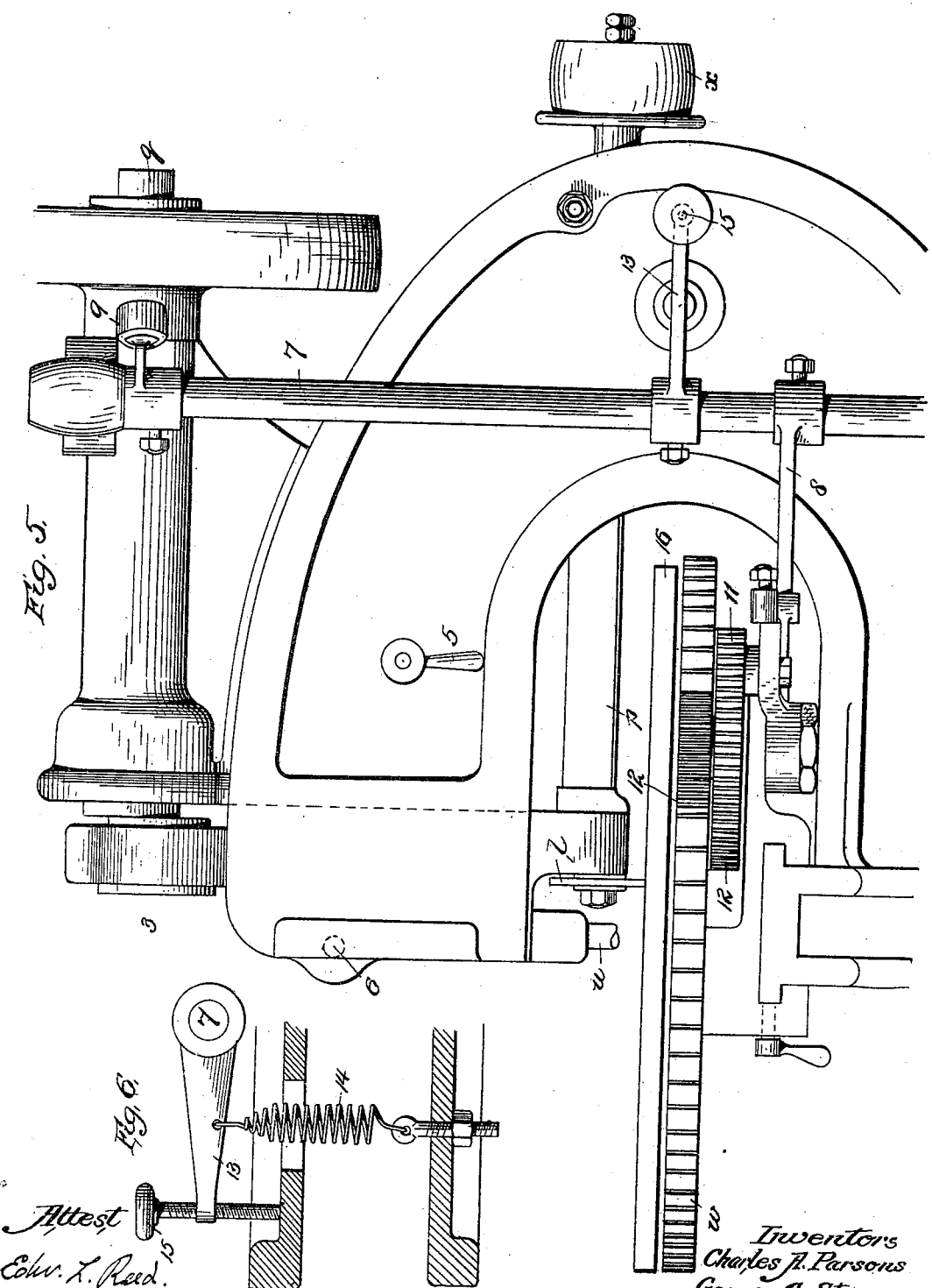

UNITED STATES PATENT OFFICE.

CHARLES A. PARSONS, GEORGE GERALD STONEY, AND HUGH F. FULLAGAR, OF NEWCASTLE-UPON-TYNE, ENGLAND.

MACHINE FOR MANUFACTURING RINGS OR SECTIONS OF TURBINE BLADES.

SPECIFICATION forming part of Letters Patent No. 666,283, dated January 22, 1901.

Application filed October 30, 1900. Serial No. 34,906. (No model.)

*To all whom it may concern:*

Be it known that we, CHARLES ALGERNON PARSONS and GEORGE GERALD STONEY, subjects of the Queen of Great Britain and Ireland, and HUGH FRANCIS FULLAGAR, all residing at Heaton Works, Newcastle-upon-Tyne, county of Northumberland, England, have invented a certain new and useful Machine for Manufacturing Rings or Sectors of Turbine Blades, (for which we have made application for Letters Patent in Great Britain, No. 16,284, bearing date August 10, 1899,) of which the following is a specification.

This invention relates to mechanism for producing metal rings of blades for steam-turbines.

The object of the invention is to provide a machine for simultaneously cutting the notches in shrouds and closing in the blades of steam-turbines.

The invention consists in a machine to be hereinafter described.

Referring to the accompanying four sheets of drawings, Figure 1 is a side elevation of a machine for cutting the notches in the shrouds and closing in the blades. The elevation is taken looking in the direction of the arrow 3, Fig. 3. Fig. 2 is a detail view corresponding to Fig. 1. Fig. 3 is a plan of the machine. Fig. 4 is a front elevation. Fig. 5 is a side elevation looking in the direction of the arrow 4, Fig. 3; and Fig. 6 is a detail view of the device for adjusting the angular movement of the table which determines the pitch of the blades.

The metal to be operated upon may be prepared as follows: Metal strips of suitable section are bent to the desired radius, cut accurately to semicircles or sectors, and placed in concentric grooves in a metal disk. The disk is placed in a suitable lathe, and the edges of the strips are machined true, and then they are removed and replaced, with the true edges downward, in the grooves. The disk, with the strips, is then taken to the special machine illustrated, which, however, is shown for simplicity as adapted to deal with one shroud only.

The machine consists, essentially, of a circular table $w$, rotated at regular intervals through a small angle, which angle can be varied by means of change-wheels operated by ratchet-gear. The angle is that required between two consecutive blades, and it is preferably made an exact divisor of two right angles. Above the table is a sliding block $t$, which receives a vertical movement from a crank $r$ on a shaft $q$ by means of a connecting-rod $s$. Suspended at one end from the slide-block $t$ and at the other from the frame of the machine is a frame or casting $k$, carrying a cutter-spindle $p$, rotated by a belt-driven pulley $x$. The cutter $l$ is carried in the slide-block end of the said cutter-spindle. One cutter only is shown.

16 is the disk having concentric grooves, which disk carries the strip $a$ and is mounted on the rotated table $w$. The cutter-spindle frame $k$ is pivoted from the main frame of the machine at $m$, and it is suspended from the sliding block $t$ by a pin $z$, which is free to move in a slot in the end of the cutter-spindle frame. The cutter-spindle frame is thrust down on the pin $z$ by the spring-pressed plunger 1, carried, with its spring 2, in the slide-block $t$. At each descent of the slide-block $t$ the cutter $l$ cuts a tooth or notch in the strip $a$. The cutter acts in an approximately radial position, and the table can be moved transversely to bring any part of its diameter under the cutter. Attached to the sliding block in front of the cutter is a punch $u$, suitably shaped in front to close down a tooth upon a blade. The blades are placed in position in the notches by hand, and the punch $u$ on descending closes over each tooth in succession, and thus secures the blades one by one. Meantime the notches are cut one by one a few teeth before the punch operates, and so the blades are accurately spaced and fixed in the strip. The stroke of the slide-block punch and cutter is adjusted, by means of the eccentric-block 3, surrounding the crank-pin, to be either increased or diminished to suit the dimensions of the blades and shrouds to be operated on. The eccentric-block 3 is rotated within the connecting-rod $s$ and fixed in any desired position to produce the required length of throw. The spring 2 serves as a relief-spring, which yields if the cutter $l$ meets with an obstruction. The pin $z$ then moves down in the slot shown, and so no damage is done. A small crank $o$ is provided with links $n$, which suspend the cutter-spindle frame $k$ at the point 4. The crank and links serve to hold the cutter $l$ out of action when desired. Handles 5 (shown in dotted lines at Fig. 1 and in detail in Fig. 2) are provided to operate the crank and links. The crank-pin $o$ works in slots in the link $n$ to allow freedom of movement of the frame $k$.

The punch $u$ has independent adjustment vertically, horizontally, and about a vertical axis. It is also arranged to pivot to the block $t$ at the pin 6 to enable it to be swung out of action as required.

The shaft $q$ in Fig. 3 operates the roller-lever 9 by means of a cam. This lever is fixed at the top of a vertical shaft 7, and the lever 8, Fig. 5, is fixed at the bottom. The shaft is pulled in one direction by the spring 14, Fig. 6, which acts on the lever 13, and the position of the shaft at one extreme of its angular motion is adjusted by the screw 15. The position of this screw determines the stroke given to the pawl-and-ratchet device 11. The pawl and ratchet is actuated from the lever 8 by the rod 10. The ratchet-wheel actuates the change-wheels 12, and so rotates the table $w$ through the desired angle. The angle of rotation is adjusted by varying the change-wheels and also by varying the pawl-stroke by adjusting the position of the screw 15. For blade-rings with two or more shrouds the machine is provided with a corresponding number of cutters and punches. The punches may be mounted upon saddles on a transverse slide and worked by eccentrics or cams from a common spindle.

The cutters may be given a horizontal instead of a vertical movement to enable separate cutters to cut teeth in shrouds placed close together; but in all modifications the main features are as hereinbefore described, and illustrated in the drawings. By this method of cutting and closing inaccuracy produced by creeping or stretching during cutting or closing is prevented, and the circles or sectors of blades produced have accurately-pitched openings and a determined width of opening.

Having now described our invention, what we claim as new, and desire to secure by Letters Patent, is—

1. Mechanism for simultaneously cutting metallic shrouds and closing teeth upon blades, comprising a machine-frame, driving-shaft, rotated table, sliding block, means for varying the travel of said block, oscillated cutter and reciprocating closing punch, substantially as described.

2. Mechanism for simultaneously cutting metallic shrouds and closing teeth upon blades, comprising: a machine-frame-driving shaft, rotated table, sliding block, means for varying the travel of said block, adjustable closing punch pivotally attached to said block, a revolving spindle carrying suitable cutter within an oscillated spindle-frame, spring-actuated plunger within said sliding block adapted to depress said cutter, means for varying the cutter depression, said cutter being adapted to form a notch simultaneously with the closing in of a tooth by said punch, the position of such notch being somewhat in advance of the tooth closed in substantially as described.

3. Mechanism for simultaneously cutting metallic shrouds and closing teeth upon blades comprising a machine-frame, sliding block, rotated table, driving-shaft with driving-pulley, cam, and crank on said shaft, an eccentric adapted to vary the travel of said block, a shaft carrying a cam-lever, spring-actuated lever and lever attached to means for rotating the table, an oscillated cutter and reciprocated closing punch, substantially as described.

In witness whereof we have hereunto set our hands in the presence of two witnesses.

CHARLES A. PARSONS.
GEORGE GERALD STONEY.
HUGH F. FULLAGAR.

Witnesses to the signature of C. A. Parsons:
GEORGE GREY,
WILLIAM DAGGETT.

Witnesses to the signatures of G. G. Stoney and H. F. Fullagar:
WILLIAM DAGGETT,
WM. GILHESPY.